US012315996B2

(12) United States Patent
Sun et al.

(10) Patent No.: US 12,315,996 B2
(45) Date of Patent: May 27, 2025

(54) ANTENNA CONNECTION APPARATUS, ANTENNA ASSEMBLY, AND ELECTRONIC DEVICE

(71) Applicant: Honor Device Co., Ltd., Shenzhen (CN)

(72) Inventors: Qiao Sun, Shenzhen (CN); Kun Li, Shenzhen (CN); Silei Huyan, Shenzhen (CN); Wukui Du, Shenzhen (CN); Chaoliang Yang, Shenzhen (CN); Zhengmiao Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 196 days.

(21) Appl. No.: 17/801,613

(22) PCT Filed: Feb. 18, 2021

(86) PCT No.: PCT/CN2021/076678
§ 371 (c)(1),
(2) Date: Aug. 23, 2022

(87) PCT Pub. No.: WO2021/169824
PCT Pub. Date: Sep. 2, 2021

(65) Prior Publication Data

US 2023/0083590 A1 Mar. 16, 2023

(30) Foreign Application Priority Data

Feb. 25, 2020 (CN) ........................ 202010117356.9

(51) Int. Cl.
*H01Q 1/50* (2006.01)
*H01Q 1/24* (2006.01)
*H01Q 1/48* (2006.01)

(52) U.S. Cl.
CPC ............... *H01Q 1/50* (2013.01); *H01Q 1/243* (2013.01); *H01Q 1/48* (2013.01)

(58) Field of Classification Search
CPC ............ H01Q 1/243; H01Q 1/38; H01Q 9/42; H01Q 1/48; H01Q 9/0414; H01Q 1/42; H01Q 1/2291
See application file for complete search history.

(56) References Cited

U.S. PATENT DOCUMENTS 10,326,196 B2 6/2019 Kim et al.
10,439,267 B2 10/2019 Seo et al.
(Continued)

FOREIGN PATENT DOCUMENTS

CN 101257141 A 9/2008
CN 107196049 A 9/2017
(Continued)

OTHER PUBLICATIONS

He et al., "Design Of Broadband Circularly Polarized Microstrip Antenna Fed by Dual F-probes," Modern Radar, vol. 39, No. 2, 5 pages (Feb. 2017).
(Continued)

*Primary Examiner* — David E Lotter
(74) *Attorney, Agent, or Firm* — Leydig, Voit & Mayer, Ltd.

(57) ABSTRACT

Disclosed are an antenna connection apparatus, an antenna assembly, and an electronic device. The electronic device may be a mobile or fixed terminal with an antenna. A non-contact coupling connection between an antenna and a feed point or a ground point is implemented by using the antenna connection apparatus, to avoid arranging an elastic bonding pad or a flexible metal buffer material on the antenna and arranging an elastic pin and the flexible metal buffer material on the feed point or the ground point, thereby
(Continued)

reducing connection cost of the antenna and a space occupied by the antenna connection apparatus in a mobile phone.

16 Claims, 9 Drawing Sheets

(56) References Cited

U.S. PATENT DOCUMENTS

| | | | | |
|---|---|---|---|---|
| 10,727,595 | B2 | 7/2020 | Liu et al. | |
| 10,734,708 | B2 | 8/2020 | Yong et al. | |
| 11,031,671 | B2 | 6/2021 | Xia et al. | |
| 11,431,109 | B2 | 8/2022 | Yun et al. | |
| 2007/0080864 | A1 | 4/2007 | Channabasappa | |
| 2011/0095945 | A1 | 4/2011 | Gianvittorio | |
| 2012/0280860 | A1* | 11/2012 | Kamgaing | H01L 23/66 29/601 |
| 2015/0294215 | A1 | 10/2015 | Manzi | |
| 2016/0211572 | A1 | 7/2016 | Liu et al. | |
| 2017/0237151 | A1* | 8/2017 | Andujar Linares | H01Q 5/328 343/702 |
| 2017/0244818 | A1 | 8/2017 | Kim et al. | |
| 2018/0159203 | A1* | 6/2018 | Baks | H01Q 9/045 |
| 2019/0326672 | A1* | 10/2019 | Lim | H01Q 19/30 |
| 2019/0333882 | A1* | 10/2019 | Kamgaing | H01Q 9/0414 |
| 2019/0348746 | A1 | 11/2019 | Gupta et al. | |
| 2019/0348748 | A1* | 11/2019 | Liu | H01L 23/3135 |
| 2020/0058998 | A1 | 2/2020 | Kirknes | |
| 2020/0212577 | A1* | 7/2020 | Xia | H01Q 1/243 |
| 2020/0313299 | A1* | 10/2020 | Jia | H01Q 5/378 |
| 2020/0412001 | A1* | 12/2020 | Ayala Vazquez | H01Q 1/243 |
| 2021/0044001 | A1* | 2/2021 | Kang | H01Q 21/0006 |
| 2021/0066156 | A1* | 3/2021 | Huang | H01L 23/3128 |
| 2021/0126348 | A1 | 4/2021 | Kim et al. | |
| 2021/0126372 | A1* | 4/2021 | Duan | H01Q 5/307 |
| 2021/0175629 | A1* | 6/2021 | Kang | H01Q 19/24 |
| 2021/0257318 | A1* | 8/2021 | Han | H01L 23/49827 |

FOREIGN PATENT DOCUMENTS

| | | | |
|---|---|---|---|
| CN | 108346854 | A | 7/2018 |
| CN | 108631039 | A | 10/2018 |
| CN | 109119768 | A | 1/2019 |
| CN | 109166845 | A | 1/2019 |
| CN | 110600872 | A | 12/2019 |
| CN | 110718739 | A | 1/2020 |
| EP | 3570323 | A1 | 11/2019 |
| WO | 2016048101 | A1 | 3/2016 |
| WO | 2018119944 | A1 | 7/2018 |
| WO | 2019160346 | A1 | 8/2019 |
| WO | 2020009529 | A1 | 1/2020 |

OTHER PUBLICATIONS

Jiang, Yichao, "Improved Dual—Polarized Broadband Antenna Based On Tight Coupling," Xidian University of Electronic Science and Technology, 82 pages (May 2017).

M. K. Mohamed Amin et al., "28/38GHZ dual band slotted patch antenna with proximity-coupled feed for 5G communication," 2017 International Symposium on Antennas and Propagation (ISAP), Phuket, Thailand, pp. 1-2 (2017).

* cited by examiner

ANTENNA CONNECTION APPARATUS, ANTENNA ASSEMBLY, AND ELECTRONIC DEVICE

CROSS-REFERENCE TO RELATED APPLICATIONS

This application is a National Stage of International Application No. PCT/CN2021/076678, filed on Feb. 18, 2021, which claims priority to Chinese Patent Application No. 202010117356.9, filed on Feb. 25, 2020. All of the aforementioned patent applications are hereby incorporated by reference in their entireties.

TECHNICAL FIELD

This application relates to the field of antenna technologies, and in particular, to an antenna connection apparatus, an antenna assembly, and an electronic device.

BACKGROUND

Intelligent terminals such as mobile phones need to communicate by using a mobile communication network provided by an operator. The intelligent terminals can further implement a communication connection between intelligent devices by using Wi-Fi, Bluetooth, infrared, or the like. For the mobile phone, a communication signal is sent and received by using an antenna. Due to various communication manners of the mobile phone, a relatively large quantity of antennas need to be arranged inside the mobile phone. Each antenna requires at least a feed point and a ground point. The antenna is electrically connected to a radio frequency module on a mainboard by the feed point and is electrically connected to a floor or a ground point of the mainboard by the ground point to implement grounding.

Currently, when the antenna is connected to the feed point or the ground point, there are mainly two connection manners. One manner is to solder an elastic pin on the feed point or the ground point. A corresponding elastic bonding pad is arranged on the antenna. The other manner is to use a screw to electrically connect a metal surface of the antenna to the feed point or the ground point.

Then, when the antenna is electrically connected to the feed point or the ground point by the elastic pin, an elastic bonding pad needs to be arranged on the antenna. Moreover, there is a corresponding design specification for the size of an elastic bonding surface. The elastic pin occupies a large space. When the antenna is electrically connected to the feed point or the ground point by the screw, a flexible metal buffer material needs to be arranged on the antenna and the feed point or the ground point, thereby leading to relatively high cost.

SUMMARY

This application provides an antenna connection apparatus, an antenna assembly, and an electronic device, to implement a non-contact coupling connection between an antenna and a feed point or a ground point, thereby reducing cost when the antenna is connected to the feed point or the ground point, reducing a space occupied by the antenna connection apparatus in the electronic device, and avoiding arranging an elastic bonding pad on the antenna body.

A first aspect of embodiments of this application provides an antenna connection apparatus, configured to couple an antenna to a feed point or a ground point. The antenna connection apparatus includes:

a solder pad, a first dielectric layer, a coupling metal layer, and a second dielectric layer that are stacked, the first dielectric layer being located between the solder pad and the coupling metal layer, the coupling metal layer being located between the first dielectric layer and the second dielectric layer, and the solder pad being electrically connected to the coupling metal layer by at least one via hole arranged in the first dielectric layer;

a side of the solder pad facing away from the first dielectric layer being used for being electrically connected to the feed point or the ground point; and a side of the second dielectric layer facing away from the coupling metal layer being connected to the antenna, to allow the antenna to be coupled to the coupling metal layer.

A side of the solder pad facing away from the first dielectric layer is electrically connected to the feed point or the ground point, and a side of the second dielectric layer facing away from the coupling metal layer is connected to the antenna, to implement a non-contact electrical connection between the feed point or the ground point and the antenna. For example, the antenna is connected to the feed point or the ground point by the antenna connection apparatus. However, a metal surface of the antenna is not in direct contact with a metal surface in the antenna connection apparatus. A direct connection between the antenna and the feed point or the ground point is replaced with a coupling connection. The metal surface of the antenna and the metal surface in the antenna connection apparatus form a coupling capacitance. The antenna is connected to the metal surface in the antenna connection apparatus under the action of the capacitance. A high-frequency current fed from the feed point is transmitted to the antenna through a coupling effect between the metal surface in the antenna connection apparatus and the antenna. The high-frequency current is emitted outward in a manner of an electromagnetic wave on the antenna. Therefore, the antenna connection apparatus provided in the embodiments of this application implements the non-contact electrical connection between the antenna and the feed point or the ground point, which avoids arranging an elastic bonding pad or a flexible metal buffer material on the antenna and arranging an elastic pin and the flexible metal buffer material on the feed point or the ground point, thereby reducing connection cost of the antenna. Moreover, there is no restriction on a metal area in which the antenna connection apparatus is coupled to the antenna, so that a volume of the antenna connection apparatus may be reduced, thereby reducing a space occupied by the antenna connection apparatus in a mobile phone.

In a possible implementation, hardness of the second dielectric layer is less than hardness of the first dielectric layer. In this way, the second dielectric layer may further reduce a gap tolerance between the coupling metal layer and the antenna, to reduce fluctuation of the coupling capacitance.

In a possible implementation, the second dielectric layer is an insulation layer made of a flexible material, and the first dielectric layer is an insulation layer made of an inflexible material. In this way, when the second dielectric layer is connected to the antenna and the coupling metal layer, the second dielectric layer may be more tightly attached to the coupling metal layer and the antenna under a pressure, thereby reducing the gap tolerance between the coupling metal layer and the antenna, to ensure that the coupling metal layer and the antenna are two parallel metal layers to reduce fluctuation of the coupling capacitance.

In a possible implementation, the second dielectric layer is a foam layer. In this way, the second dielectric layer may further reduce a gap tolerance between the coupling metal layer and the antenna, to reduce fluctuation of the coupling capacitance.

In a possible implementation, the second dielectric layer and the first dielectric layer are hard insulation layers made of inflexible materials. In this way, under an external force, a distance between the coupling metal layer and the solder pad will not be reduced, and a height of the coupling metal layer in a vertical direction will not be reduced, avoiding a problem that the distance between the antenna and the coupling metal layer is increased and consequently the coupling effect between the antenna and the coupling metal layer is reduced.

In a possible implementation, the first dielectric layer is a dielectric layer made of a resin material, ceramic, or a composite material.

In a possible implementation, a thickness of the second dielectric layer is not greater than 3 mm, which ensures that a coupling interval between the antenna and the coupling metal layer meets a requirement of capacitive coupling.

In a possible implementation, a thickness of the first dielectric layer is greater than 0.1 mm, which ensures the coupling effect.

In a possible implementation, an orthographic projection area of the antenna connection apparatus facing the antenna is less than or equal to 1 $mm^2$.

In a possible implementation, an orthographic projection of the second dielectric layer on the coupling metal layer completely covers the coupling metal layer, or the orthographic projection of the second dielectric layer on the coupling metal layer partially covers the coupling metal layer.

A second aspect of the embodiments of this application provides an antenna assembly, including: at least one antenna, a feed point, a feed electrically connected to the feed point, and at least one antenna connection apparatus according to any one of the foregoing descriptions; and a solder pad in the antenna connection apparatus being electrically connected to the feed point, and a second dielectric layer in the antenna connection apparatus being connected to the antenna.

In a possible implementation, the antenna assembly further includes a ground point, a plurality of antenna connection apparatuses being arranged, the antenna being coupled and electrically connected to the feed point by one of the antenna connection apparatuses, and the antenna being coupled and electrically connected to the ground point by another one of the antenna connection apparatuses.

In a possible implementation, the solder pad in the antenna connection apparatus is electrically connected to the feed point or the ground point by using a surface mount technology SMT; and the second dielectric layer in the antenna connection apparatus is connected to the antenna in a bonding manner.

A third aspect of the embodiments of this application provides an electronic device, including a display screen, a circuit board, and a housing, the circuit board being located in a space defined by the housing and the display screen, and further including the antenna assembly according to any one of foregoing descriptions, the feed point and the feed in the antenna assembly being arranged on the circuit board.

By including the foregoing antenna connection apparatus, the high-frequency current fed from the feed point is transmitted to the antenna through the coupling effect between the metal surface in the antenna connection apparatus and the antenna. The high-frequency current is emitted outward in the manner of the electromagnetic wave on the antenna, to implement a non-contact coupling and electrical connection between the antenna and the feed point or the ground point, and avoid arranging the elastic bonding pad or the flexible metal buffer material on the antenna and arranging the elastic pin and the flexible metal buffer material on the feed point or the ground point, thereby reducing the cost of the antenna connection. There is no restriction on the metal area in which the antenna connection apparatus is coupled to the antenna, so that the volume of the antenna connection apparatus may be reduced, thereby reducing the space occupied by the antenna connection apparatus in the mobile phone. In addition, the non-contact electrical connection between the antenna and the feed point or the ground point avoids a problem that a harmonic is generated by contact between the antenna and the feed point or ground point through metal.

In a possible implementation, at least a part of antennas in the antenna assembly is arranged on an inner surface of the housing facing the display screen; and a third dielectric layer made of a flexible material is arranged between the antenna and the inner surface of the housing. In this way, the third dielectric layer can absorb the deformation amount, so that a gap tolerance between the antenna and a battery cover is reduced, thereby ensuring that the antenna is more tightly attached to the coupling metal layer.

In a possible implementation, the third dielectric layer is a dielectric layer made of non-conductive foam.

In a possible implementation, the antenna may be a flexible printed circuit (FPC) antenna, a laser-direct-structuring (LDS) antenna, a mode decoration antenna (MDA), or a metal frame antenna.

In a possible implementation, the housing includes a metal frame, and at least a part of a region of the metal frame is used as the antenna; and an inner side of the metal frame used as the antenna is provided with at least one metal extending portion, and the antenna is connected to the second dielectric layer in the antenna connection apparatus by the metal extending portion. In this way, the antenna connection apparatus implements the non-contact coupling connection between the antenna and the feed point or the ground point.

In a possible implementation, a part of the inner side of the metal frame faces inward and extends along a horizontal direction to form a boss, and the boss is used as the metal extending portion.

DESCRIPTION OF EMBODIMENTS

Terms used in implementations of this application are merely intended to explain specific embodiments of this application rather than limit this application. The following describes the embodiments of this application in detail with reference to the accompanying drawings.

An electronic device provided in the embodiments of this application includes but is not limited to a mobile or fixed terminal with an antenna such as a mobile phone, a tablet computer, a notebook computer, an ultra-mobile personal computer (UMPC), a handheld computer, a walkie-talkie, a netbook, a POS machine, a personal digital assistant (PDA), a wearable device, a virtual reality device, a wireless USB flash drive, a Bluetooth speaker/earphone, or a part mounted on the front of a vehicle.

In the embodiments of this application, an example in which the mobile phone is the foregoing electronic device is used for description. The mobile phone provided in the embodiments of this application can be a bar phone, a slide phone, or a foldable phone. Specifically, in the embodiments of this application, descriptions are made by using the bar phone as an example. A display screen of the mobile phone provided in the embodiments of this application may be a water-drop screen, a notch screen, a hole-punch screen, or a full screen. The following descriptions are made by using the hole-punch screen as an example.

Figure 1:
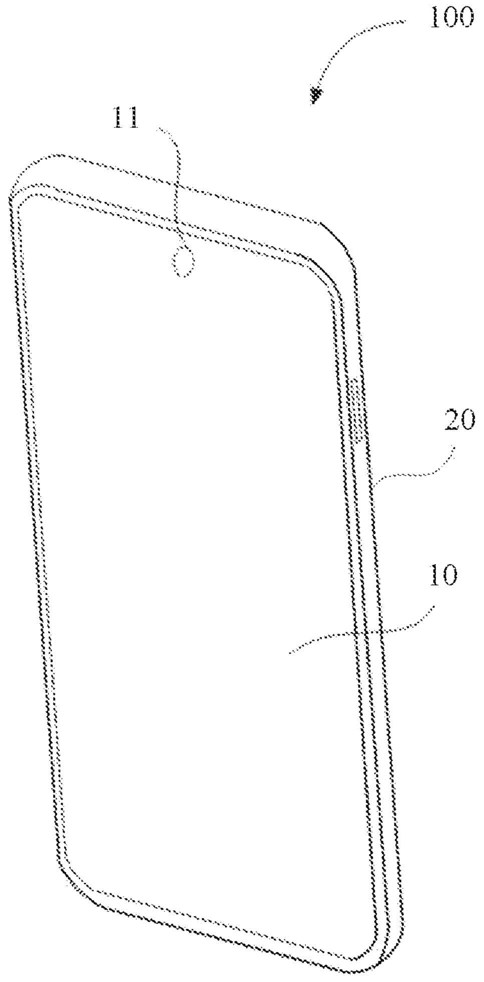
FIG. 1 is a schematic three-dimensional structural diagram of an electronic device according to an embodiment of this application.
Figure 2A:
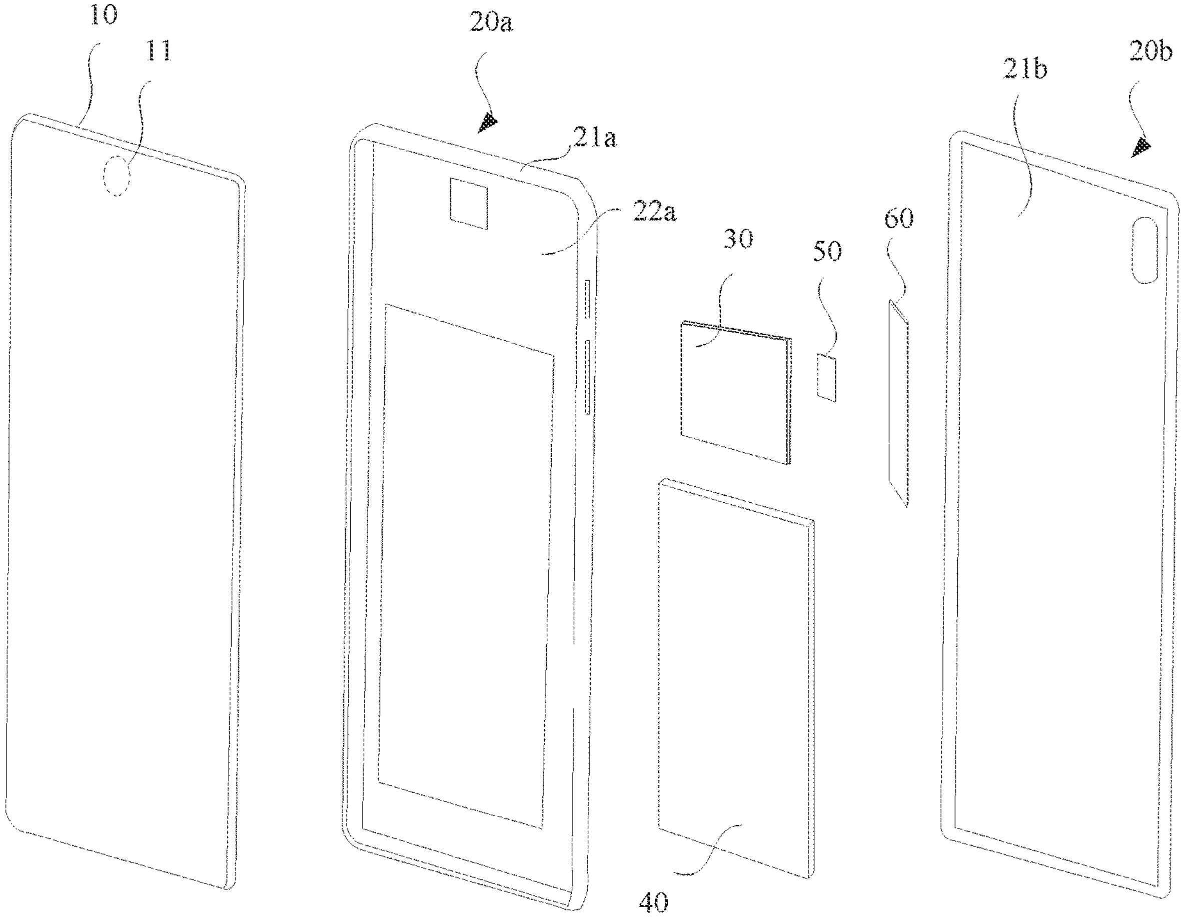
FIG. 2A is a schematic structural exploded view of an electronic device according to an embodiment of this application.

Each of FIG. 1 and FIG. 2A shows a structure of a mobile phone. Referring to FIG. 1, a mobile phone 100 may include: a display screen 10 and a housing 20. As shown in FIG. 2A, the housing 20 may include a middle frame 20*a* and a battery cover 20*b*. The middle frame 20*a*, a circuit board 30, and a battery 40 may be arranged between the display screen and the battery cover 20*b*. The circuit board 30 and the battery cover 20*b* may be arranged on the middle frame 20*a*. For example, the circuit board 30 and the battery 40 are arranged on a side of the middle frame 20*a* facing the battery cover 20*b*. Alternatively, the circuit board 30 and the battery 40 may be arranged on a side of the middle frame 20*a* facing the display screen. Arrangement positions of the battery cover 20*b* and the circuit board 30 are not limited in this embodiment.

In this embodiment of this application, the battery 40 may be connected to the circuit board 30 by a power management module and a charging management module. The power management module receives an input of the battery 40 and/or the charging management module, and supplies power to a processor, an internal memory, an external memory, the display screen, a camera, a communication module, and the like. The power management module may be further configured to monitor a parameter such as a capacity of the battery 40, a cycle count of the battery 40, or a health state (electric leakage and impedance) of the battery 40. In some other embodiments, the power management module may be alternatively arranged in the processor of the circuit board 30. In some other embodiments, the power management module and the charging management module may alternatively be arranged in the same device.

The display screen may be an organic light-emitting diode (OLED) display screen, or a liquid crystal display (LCD) screen. An opening 11 corresponding to a front-facing camera (not shown) is provided on the display screen. It should be noted that, the display screen generally includes a transparent protection cover plate. The opening 11 is provided on a display module of the display screen.

The battery cover 20*b* may be a metal battery cover, a glass battery cover, a plastic battery cover, or a ceramic battery cover. The material of the housing 20 is not limited in this embodiment of this application.

Referring to FIG. 2A, the middle frame 20*a* may include a metal middle plate 22*a* and a frame 21*a*. The frame 21*a* is arranged around an outer periphery of the metal middle plate 22*a*. Generally, the frame 21*a* may include a top frame, a bottom frame, a left frame, and a right frame. The top frame, the bottom frame, the left frame, and the right frame define the frame 21*a* in a square ring structure. The metal middle plate 22*a* may be an aluminum plate, an aluminum alloy plate, or a magnesium alloy plate. The frame 21*a* may be a metal frame 21*a*, a ceramic frame 21*a*, or a glass frame 21*a*. The metal middle frame 20*a* and the frame 21*a* may be clamped, soldered, bonded, or integrally formed. Alternatively, the metal middle frame 20*a* may be fixedly connected to the frame 21*a* by injection molding.

Figure 2B:
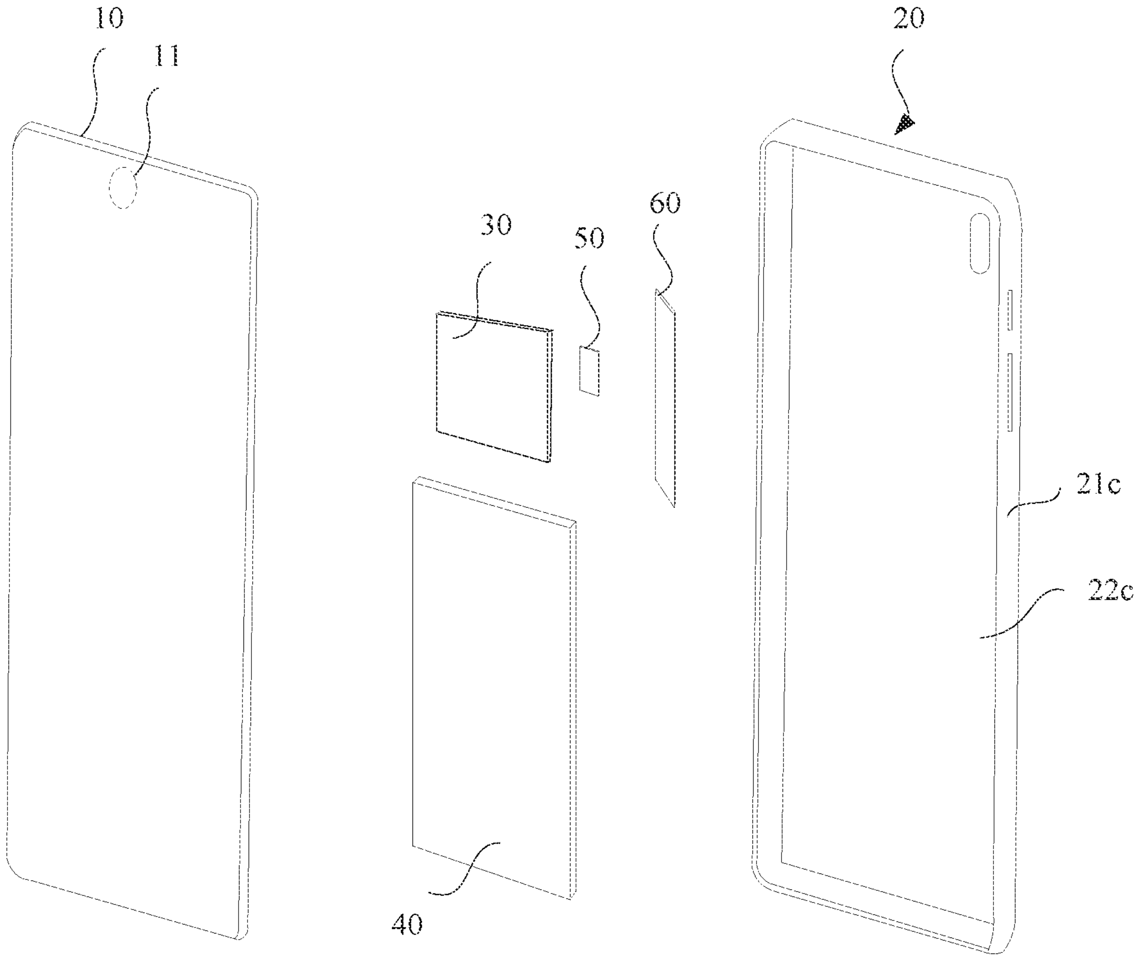
FIG. 2B is another schematic structural exploded view of an electronic device according to an embodiment of this application.

It should be noted that, in some other examples, the structure of the mobile phone 100 may be further shown in FIG. 2B. For example, a mobile phone 100 may include: a display screen 10 and a housing 20. The housing 20 may be an integrally formed (Unibody) battery cover having a frame 21*c*. For example, the battery cover may include the frame 21*c* and a bottom cover 22*c*. The frame 21*c* and the bottom cover 22*c* may be integrally formed by injection molding. In this embodiment, the frame 21*a* and the battery cover 20*b* in FIG. 2A can be integrally formed to form the housing 20 in FIG. 2B.

Figure 3A:
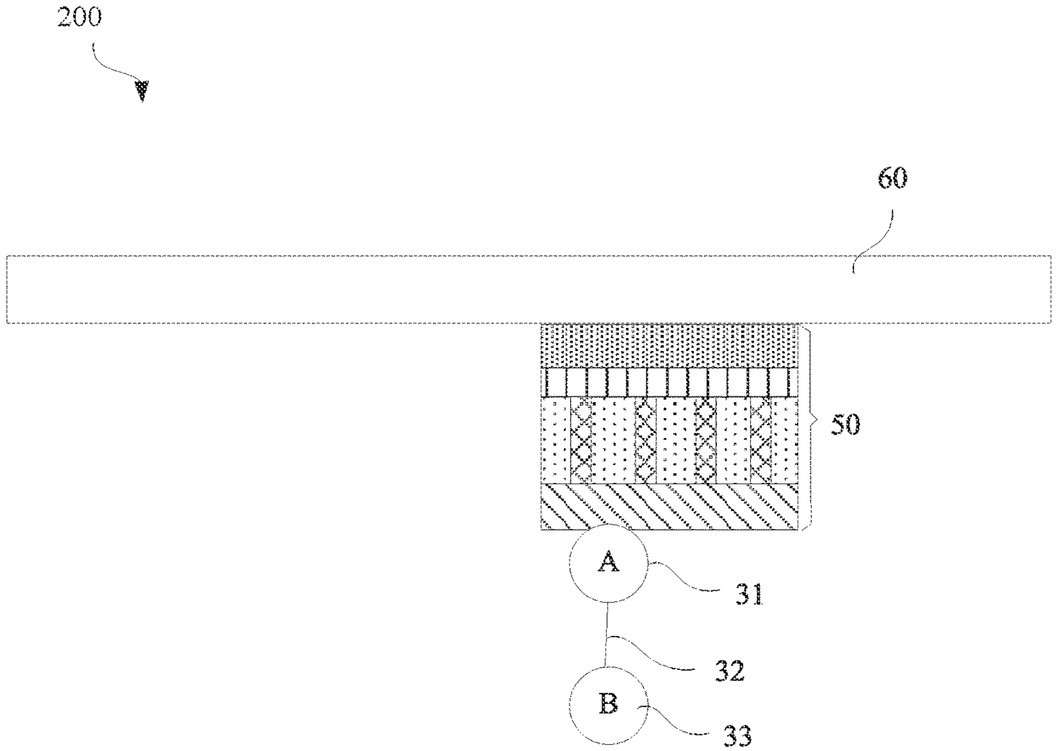
FIG. 3A is a schematic structural diagram of an antenna assembly in an electronic device according to an embodiment of this application.

In order to ensure a normal communication of the electronic device, an antenna assembly 200 is further arranged in the electronic device. As shown in FIG. 3A, the antenna assembly 200 may include at least one antenna 60, a feed point 31, and a feed 33 electrically connected to the feed point 31. The feed point 31 and the feed 33 are arranged on a circuit board 30. The feed point 31 may be electrically connected to the feed 33 by a feeder 32. The feed 33 may be a radio frequency module. The feed point 31 is a conductive point. The feed point 31 is used for feeding a high-frequency current emitted from the feed 33 to the antenna 60.

There may be a plurality of antennas 60. The plurality of antennas 60 may include several of a multiple-input multiple-output (MIMO) antenna, a Bluetooth antenna, a GPS antenna, a Wi-Fi antenna, a main antenna, and a diversity antenna. An operating frequency band of the MIMO antenna may be (1.7 to 2.2 GHz) and (2.3 to 2.6 GHz). An operating frequency band of the Bluetooth antenna may be (2400 to 2500 MHz). An operating frequency band of the GPS antenna may be (1575 to 1602 MHz). An operating frequency band of the Wi-Fi antenna may be (2400 to 2500 MHz), An operating frequency band of the main antenna may be (824 to 960 MHz), (1710 to 2170 MHz), and (2500 to 2690 MHz).

In this embodiment of this application, with the development of 5G technologies, the plurality of antennas 60 may further include a 5G antenna. An operating frequency band of the 5G antenna may be (3300 to 3600 MHZ) and (4800 to 5000 MHz). It should be noted that, the foregoing operating frequency bands may alternatively be adjusted according to an actual case.

In order to allow the antenna 60 to emit an electrical signal outward or receive an electrical signal, the antenna 60 often needs to be electrically connected to the feed point 31 on the circuit board 30. The feed 33 electrically connected to the feed point 31 by the feeder 32 is arranged on the circuit board 30. The feed 33 feeds the high-frequency current to the antenna 60 by using the feed point 31. The high-frequency current is emitted outward in a manner of an electromagnetic wave on the antenna 60.

Figure 3B:
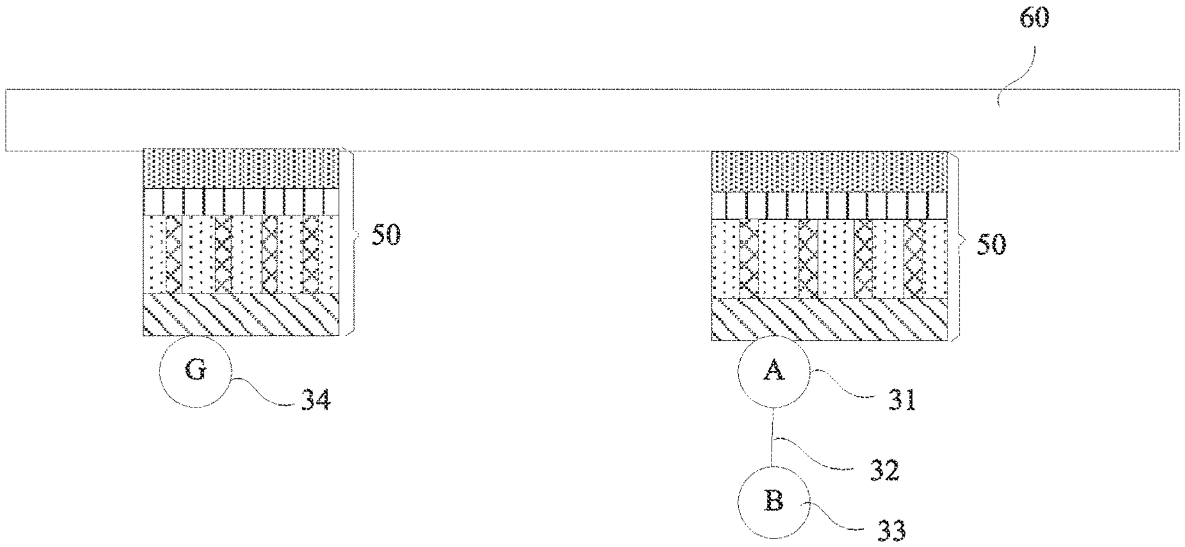
FIG. 3B is another schematic structural diagram of an antenna assembly in an electronic device according to an embodiment of this application.

In addition, for a dipole antenna, the antenna 60 further needs to be grounded. Referring to FIG. 3B, the antenna assembly 200 further includes a ground point 34. For example, the ground point 34 may be located on the circuit board 30. Alternatively, the ground point 34 may be located on a floor (for example, a metal middle plate 22*a*). It should be noted that, the ground point 34 may be a contact point at which the antenna is electrically connected to a ground layer on the circuit board 30. Alternatively, the ground point 34 may be a contact point at which the antenna 60 abuts the floor.

In a conventional technology, the antenna 60 is electrically connected to the feed point 31 or the ground point 34 by an elastic pin to be in contact with an elastic bonding pad on the antenna 60. Alternatively, the antenna 60 is electrically connected to the feed point 31 or the ground point 34 by a screw. However, when the electrical connection is implemented by using an elastic pin to be in contact with the elastic bonding pad on the antenna 60, the elastic bonding pad needs to be arranged on the antenna 60. Moreover, there is a corresponding design specification for the size of an elastic bonding surface. The elastic pin occupies a large space. Moreover, during assembly, when the elastic pin abuts the elastic bonding pad, and the antenna 60 is arranged on an inner surface of a battery cover 20*b*, an acting force of the elastic pin on the battery cover 20*b* increases. Particularly, when there are a relatively large quantity of antennas 60 arranged on the inner surface of the battery cover 20*b*, a relatively large quantity of elastic pins need to be arranged, so that the plurality of elastic pins apply a relatively large pressure to the battery cover 20*b*.

However, when the antenna 60 is electrically connected to the feed point 31 or the ground point 34 by the screw, a flexible metal buffer material needs to be arranged on the antenna 60 and the feed point 31 or the ground point 34, thereby leading to relatively high cost.

In addition, in the foregoing two connection manners, the antenna 60 is electrically connected to the feed point 31 or the ground point 34 in a direct contact manner. For example, the feed point 31 or the ground point 34 is in direct electrical contact with the screw. The screw is in electrical contact with the antenna 60. Alternatively, the feed point 31 or the ground point 34 is in direct electrical contact with the elastic pin. The elastic pin is in direct point contact with the elastic bonding pad. In addition, the screw, the elastic pin, and the elastic bonding pad are all made of hard materials, so that a harmonic is likely to occur during the direct contact. In addition, when the elastic pin or the flexible metal buffer material is arranged at the feed point 31 or the ground point 34, a step of laser engraving on the metal surface is further required. There are a relatively large quantity of steps of the whole assembly, thereby affecting assembly efficiency.

In order to resolve the foregoing problems, in this embodiment of this application, referring to FIG. 3B, the antenna assembly 200 further includes at least one antenna connection apparatus 50. Anon-contact electrical connection between the feed point 31 or the ground point 34 and the antenna 60 may be implemented by using the antenna connection apparatus 50. For example, referring to FIG. 3B, the antenna 60 is connected to the feed point 31 or the ground point 34 by the antenna connection apparatus 50. A metal surface of the antenna 60 is not in direct contact with a metal surface in the antenna connection apparatus 50. A direct connection between the antenna 60 and the feed point 31 or the ground point 34 is replaced with a coupling connection. The metal surface of the antenna 60 and the metal surface in the antenna connection apparatus 50 form a coupling capacitance. The antenna 60 is coupled to the metal surface in the antenna connection apparatus 50 under the action of the capacitance. In this way, a high-frequency current fed from the feed point 31 is transmitted to the antenna 60 through the coupling effect between the metal surface in the antenna connection apparatus 50 and the antenna 60. The high-frequency current is emitted outward in a manner of an electromagnetic wave on the antenna 60.

In this embodiment of this application, referring to FIG. 3B, when the antenna assembly 200 includes the feed point 31 and the ground point 34, there are at least two antenna connection apparatuses 50. One antenna connection apparatus 50 may couple the feed point 31 to the antenna 60. Another antenna connection apparatus 50 may connect the antenna 60 to the ground point 34.

In this embodiment of this application, the antenna connection apparatus 50 implements a non-contact electrical connection between the antenna 60 and the feed point 31 or the ground point 34, avoiding arranging an elastic bonding pad or a flexible metal buffer material on the antenna 60 and arranging an elastic pin and the flexible metal buffer material on the feed point 31 or the ground point, thereby reducing connection cost of the antenna 60. Moreover, there is no restriction on a metal area in which the antenna connection apparatus 50 is coupled to the antenna 60, so that a volume of the antenna connection apparatus 50 may be reduced, thereby reducing a space occupied by the antenna connection apparatus 50 in the mobile phone 100.

Figure 4A:
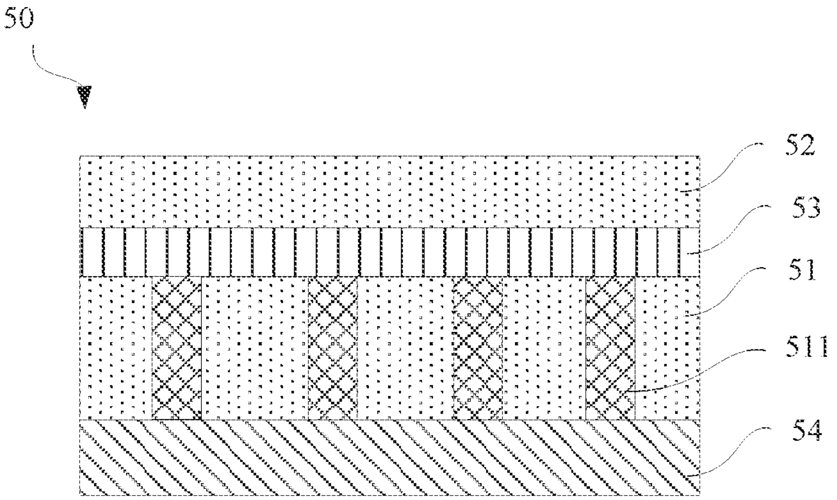
FIG. 4A is a schematic cross-sectional structural diagram of an antenna connection apparatus in an electronic device according to an embodiment of this application.

In a possible implementation, as shown in FIG. 4A, the antenna connection apparatus 50 may include: a solder pad 54, a first dielectric layer 51, a coupling metal layer 53, and a second dielectric layer 52 that are stacked. The first dielectric layer 51 is located between the solder pad 54 and the coupling metal layer 53. For example, the first dielectric layer 51 may be an insulation layer to separate the solder pad 54 from the coupling metal layer 53. The solder pad 54 is electrically connected to the coupling metal layer 53 by at least one via hole 511 arranged in the first dielectric layer 51. For example, as shown in FIG. 4A, four via holes 511 are arranged in the first dielectric layer 51. The solder pad 54 is electrically connected to the coupling metal layer 53 by the four via holes 511. Certainly, in some other examples, the quantity of via holes 511 includes, but is not limited to 4, and may alternatively be 1, 3, or at least 5.

It should be noted that, the via hole 511 is a conductive hole formed by filling a hole with a conductive material. The via hole 511 may be perpendicularly arranged in the first dielectric layer 51. Certainly, the via hole 511 may alternatively be obliquely arranged in the first dielectric layer 51.

The coupling metal layer 53 is located between the first dielectric layer 51 and the second dielectric layer 52. For example, as shown in FIG. 4A, the coupling metal layer 53 is clamped between the first dielectric layer 51 and the second dielectric layer 52. The second dielectric layer 52 is an insulation layer, so that an upper end face and a lower end face of the coupling metal layer 53 both have insulation layers. Therefore, the coupling metal layer cannot be in direct contact with other metal surfaces (that is, the antenna 60 and the solder pad 54), thereby implementing a coupling connection between the two metal layers.

In this embodiment of this application, a side of the solder pad 54 facing away from the first dielectric layer 51 is used for being electrically connected to the feed point 31 or the ground point 34. For example, the solder pad 54 may be electrically connected to the feed point 31 or the ground point 34 by using a surface mount technology (SMT). Certainly, the solder pad 54 may alternatively be electrically connected to the feed point 31 or the ground point 34 in another manner.

In this embodiment of this application, a high-frequency current fed from a feed 33 may be fed into the solder pad 54 by using the feed point 31. The high-frequency current on the solder pad 54 is transmitted to the coupling metal layer 53 by using the via hole 511. The coupling metal layer 53 is coupled to the antenna 60 to allow the high-frequency current to be transmitted to the antenna 60 and to be emitted outward.

In this embodiment, a side of the second dielectric layer 52 facing away from the coupling metal layer 53 is connected to the antenna 60. For example, a top surface of the second dielectric layer 52 is connected to the antenna 60, so that the antenna 60 is separated from the coupling metal layer 53 by using the second dielectric layer 52. The antenna 60 is coupled to the coupling metal layer 53, so that a non-contact connection between the antenna 60 and the coupling metal layer 53 is implemented. The second dielectric layer 52 in the antenna connection apparatus 50 may be connected to the antenna 60 in a bonding manner. For example, the second dielectric layer 52 is connected to the antenna 60 by gluing. Certainly, the second dielectric layer 52 may alternatively be connected to the antenna 60 in another manner.

In this embodiment of this application, the first dielectric layer 51 may separate the solder pad 54 from the coupling metal layer 53 in an aspect, and may further play a role in supporting the coupling metal layer 53 in another aspect, so that the coupling metal layer 53 is not likely to move close to the solder pad 54 under an external force. In an aspect, the second dielectric layer 52 separates the antenna 60 from the coupling metal layer 53. In another aspect, the second dielectric layer 52 may further reduce a gap tolerance between the coupling metal layer 53 and the antenna 60 to reduce fluctuation of a coupling capacitance.

In a possible implementation, the first dielectric layer 51 needs to play a role in supporting the coupling metal layer 53. If the first dielectric layer 51 is made of a flexible material, a distance between the coupling metal layer 53 and the solder pad 54 is reduced under the external force. A height of the coupling metal layer 53 in a vertical direction is reduced. For example, the coupling metal layer moves away from the antenna 60, so that a distance between the antenna 60 and the coupling metal layer 53 is increased, and consequently a coupling effect between the antenna 60 and the coupling metal layer 53 is reduced. Therefore, in this embodiment of this application, the first dielectric layer 51 is a hard layer made of an inflexible material.

In a possible implementation, referring to FIG. 4A, the second dielectric layer 52 and the first dielectric layer 51 may both be hard insulation layers made of inflexible materials. For example, the second dielectric layer 52 and the first dielectric layer 51 may be hard dielectric layers made of a resin material (for example, a resin material with a flame resistance grade of FR4), ceramic, or a composite material. The materials of the second dielectric layer 52 and the first dielectric layer 51 may be the same (for example, in FIG. 4A), or may be different.

In another possible implementation, because the second dielectric layer 52 is in contact with and connected to the antenna 60, when hardness of the second dielectric layer 52 is relatively large, the gap tolerance between the coupling metal layer 53 and the antenna 60 is relatively large after the second dielectric layer 52 is connected to the antenna 60 and the coupling metal layer 53. For example, it is difficult to keep the gap between the coupling metal layer 53 and the antenna 60 uniform due to the second dielectric layer 52 with relatively large hardness. Therefore, the gap tolerance between the coupling metal layer 53 and the antennas 60 is large, so that the coupling metal layer 53 and the antenna 60 cannot be in a parallel state, and the fluctuation of the coupling capacitance is relatively large.

Figure 4B:
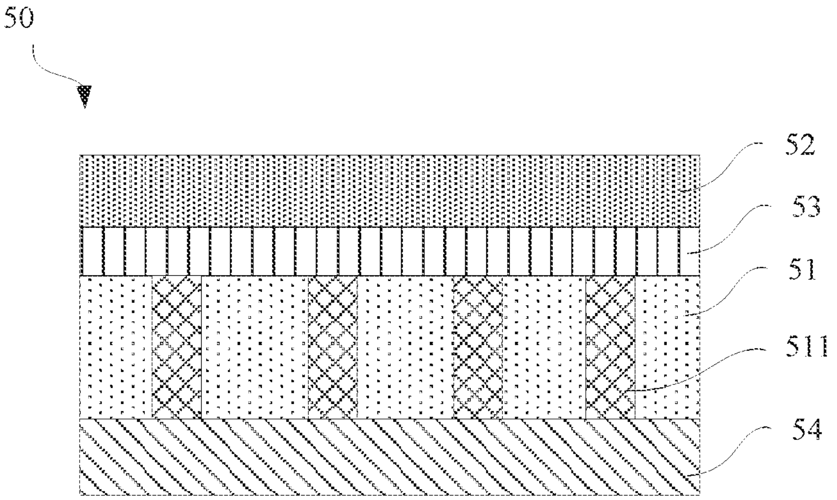
FIG. 4B is another schematic cross-sectional structural diagram of an antenna connection apparatus in an electronic device according to an embodiment of this application.

Therefore, referring to FIG. 4B, the second dielectric layer 52 and the first dielectric layer 51 are made of different materials. The hardness of the second dielectric layer 52 is less than that of the first dielectric layer 51. For example, the hardness of the first dielectric layer 51 and the hardness of the second dielectric layer 52 are different, and the hardness of the second dielectric layer 52 is smaller. When the hardness of the second dielectric layer 52 is smaller, the second dielectric layer 52 may be more tightly attached to the coupling metal layer 53 and the antenna 60 under a pressure when the second dielectric layer 52 is connected to the antenna 60 and the coupling metal layer 53, thereby reducing the gap tolerance between the coupling metal layer 53 and the antenna 60, ensuring that the coupling metal layer and the antenna 60 are two parallel metal layers, and reducing the fluctuation of the coupling capacitance.

The second dielectric layer 52 may be an insulation layer made of a flexible material. For example, the second dielectric layer 52 may be made of a flexible board. For details of the flexible material, reference may be made to a flexible material in the conventional technology. Composition of the flexible material is not limited in this embodiment. For example, in this embodiment, the second dielectric layer 52 may be a foam layer, so that the foam layer may be compressed, thereby implementing a smaller gap tolerance between the antenna 60 and the coupling metal layer 53.

Certainly, in some other examples, the second dielectric layer 52 may be made of a material including, but not limited to a foam material. It should be noted that, because the second dielectric layer 52 is the insulation layer, the second dielectric layer 52 is made of a non-conductive foam material. It should be noted that, when the second dielectric layer 52 is a foam layer, the foam layer may be made of foam glue, so that the antenna 60 is glued to the second dielectric layer 52. Alternatively, in this embodiment, when the second dielectric layer 52 is not sticky and cannot be glued to the antenna 60, a separate layer of glue may be arranged to bond the second dielectric layer 52 and the antenna 60 together.

In a possible implementation, because the second dielectric layer 52 is connected to the antenna 60 and the coupling metal layer 53, a coupling interval between the antenna 60 and the coupling metal layer 53 is related to a thickness of the second dielectric layer 52. If the thickness of the dielectric layer 52 is relatively large, the coupling interval between the antenna 60 and the coupling metal layer 53 is unlikely to meet a requirement of capacitive coupling, so that coupling between the antenna 60 and the coupling metal layer 53 cannot be implemented. Therefore, in this embodiment of this application, the thickness of the second dielectric layer 52 is not greater than 3 mm. For example, the thickness of the second dielectric layer 52 may be 3 mm, or the thickness of the second dielectric layer 52 may be 2 mm.

In a possible implementation, when a distance between the solder pad 54 and the antenna 60 is a fixed value, if the thickness of the first dielectric layer 51 is reduced, the distance between the coupling metal layer 53 and the antenna 60 increases, which will affect a coupling effect. Therefore, in this embodiment of this application, the thickness of the first dielectric layer 51 is greater than 0.1 mm. For example, the thickness of the first dielectric layer 51 may be 1 mm, or the thickness of the first dielectric layer 51 may be 0.5 mm. Certainly, in some other examples, the thickness of the first dielectric layer 51 includes, but not limited to 1 mm or 0.5 mm, and may alternatively be another value.

In a possible implementation, an orthographic projection area of the antenna connection apparatus 50 facing the antenna 60 is less than or equal to 1 $mm^2$. For example, the orthographic projection area of the antenna connection apparatus 50 facing the antenna 60 may be 0.81 $mm^2$, or the orthographic projection area of the antenna connection apparatus 50 facing the antenna 60 may be 0.72 $mm^2$.

It should be noted that, the orthographic projection of the antenna connection apparatus 50 facing the antenna 60 is a projection of the antenna connection apparatus 50 perpendicularly facing the antenna 60. When the antenna connection apparatus 50 provided in this embodiment of this application is connected to the antenna 60, there is no restriction on a connection area, so that a volume of the antenna connection apparatus 50 may be reduced. In this way, a space occupied in the mobile phone 100 is reduced, and a saved volume may be used for arranging another component.

In a possible implementation, referring to FIG. 4B, the orthographic projection of the second dielectric layer 52 on the coupling metal layer 53 completely covers the coupling metal layer 53. For example, the second dielectric layer 52 completely covers the coupling metal layer 53. The second dielectric layer 52 is an entire layer structure that may cover the coupling metal layer 53.

Figure 4C:
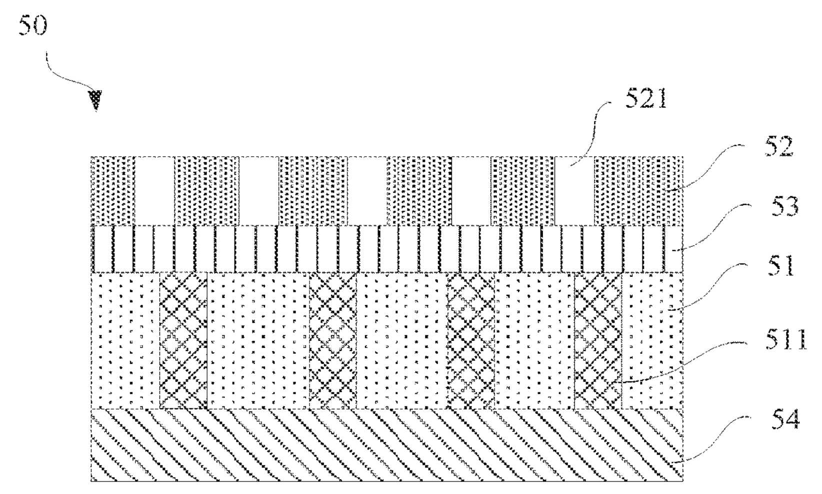
FIG. 4C is still another schematic cross-sectional structural diagram of an antenna connection apparatus in an electronic device according to an embodiment of this application.

Alternatively, referring to FIG. 4C, the orthographic projection of the second dielectric layer 52 on the coupling metal layer 53 partially covers the coupling metal layer 53. For example, the second dielectric layer 52 may be arranged at intervals on the coupling metal layer 53. A part of a region of the coupling metal layer 53 is exposed, so that after the second dielectric layer 52 is connected to the antenna 60, there is a gap 521 between the coupling metal layer 53 and the antenna 60, thereby facilitating flowing of air in the gap 521 and implementing good heat dissipation for the antenna connection apparatus 50.

In this embodiment of this application, the antenna 60 may be a flexible printed circuit (FPC) antenna, the antenna 60 may be a laser-direct-structuring (LDS) antenna, the antenna 60 may be a mode decoration antenna (MDA), or the antenna 60 may be a metal frame antenna (that is, a metal frame used as the antenna).

Applications of the antenna connection apparatus 50 in different antennas 60 will be described in detail below. For example, the first application between the antenna connection apparatus 50 and the FPC antenna is set as Scenario 1. The second application between the antenna connection apparatus 50 and the FPC antenna is set as Scenario 2. The third application of the antenna connection apparatus 50 on the metal frame antenna is set as Scenario 3.

For Scenario 1, Scenario 2, and Scenario 3, structures of the antenna connection apparatus 50 when applied to different antennas 60 will be respectively described below.

Scenario 1

Figure 5A:
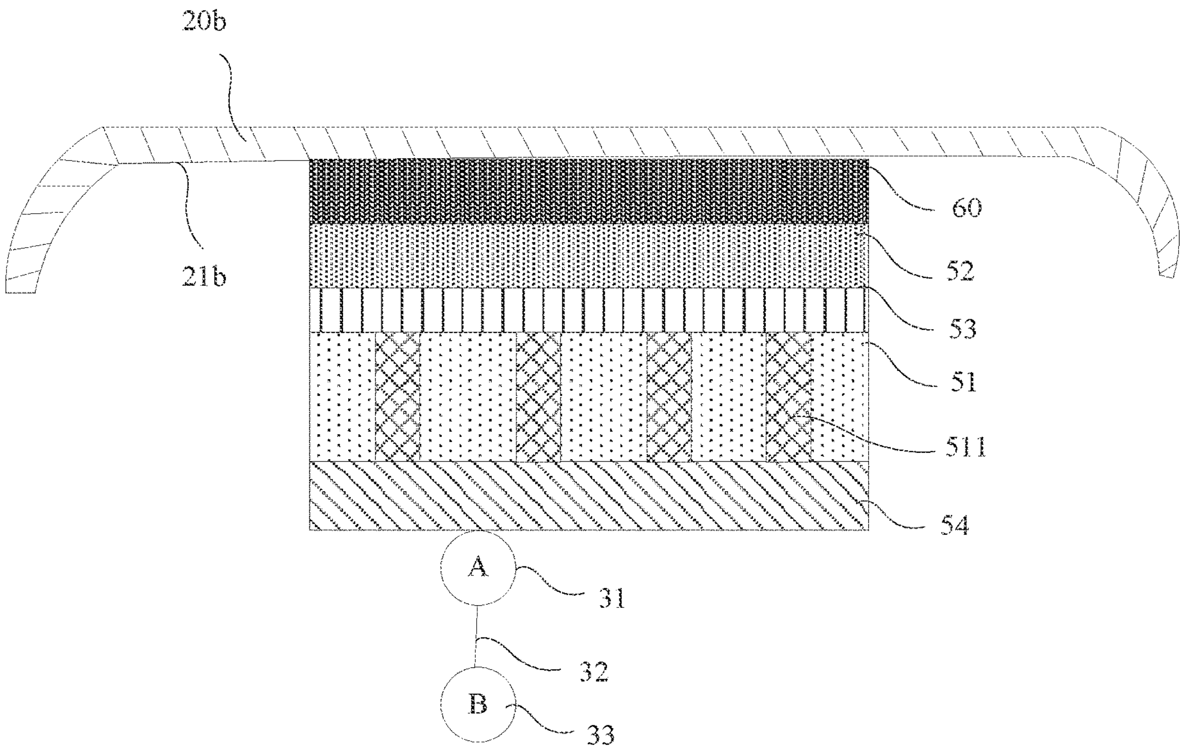
FIG. 5A is a schematic cross-sectional structural diagram of an antenna assembly and a battery cover in an electronic device according to an embodiment of this application.

In this scenario, an example in which the antenna 60 is the FPC antenna is used for description. Referring to FIG. 5A, the FPC antenna is arranged on an inner surface 21*b* of a battery cover 20*b*. A second dielectric layer 52 of the antenna connection apparatus 50 is connected to a side of the FPC antenna. A solder pad 54 of the antenna connection apparatus 50 is connected to a feed point 31 by SMT bonding. In this scenario, a first dielectric layer 51 is made of a resin with a flame resistance grade of FR4. The second dielectric layer 52 may be a foam layer.

After mounting, the second dielectric layer 52 is clamped between the antenna 60 and a coupling metal layer 53. The second dielectric layer 52 is made of foam. Therefore, the second dielectric layer 52 absorbs a deformation amount, so that a gap tolerance between the antenna 60 and the coupling metal layer 53 is reduced, thereby reducing fluctuation of a coupling capacitance.

In this embodiment, the second dielectric layer 52 is arranged between the antenna 60 and the coupling metal layer 53. The second dielectric layer 52 is made of a flexible material. After assembly, the second dielectric layer 52 may play a buffer role between the antenna 60 and the coupling metal layer 53. Moreover, a non-contact connection of the antenna 60 allows a pressure applied by the antenna connection apparatus 50 to the antenna 60 to be less than a pressure applied by an elastic pin and a screw to the antenna 60, thereby ensuring that, after the antenna 60 is connected to the feed point 31, the pressure applied by the antenna connection apparatus 50 to the battery cover 20*b* is reduced. In this way, the battery cover 20*b* may bear an arrangement of more antennas 60, so that a mobile phone 100 may cover more frequency bands.

Scenario 2

Figure 5B:
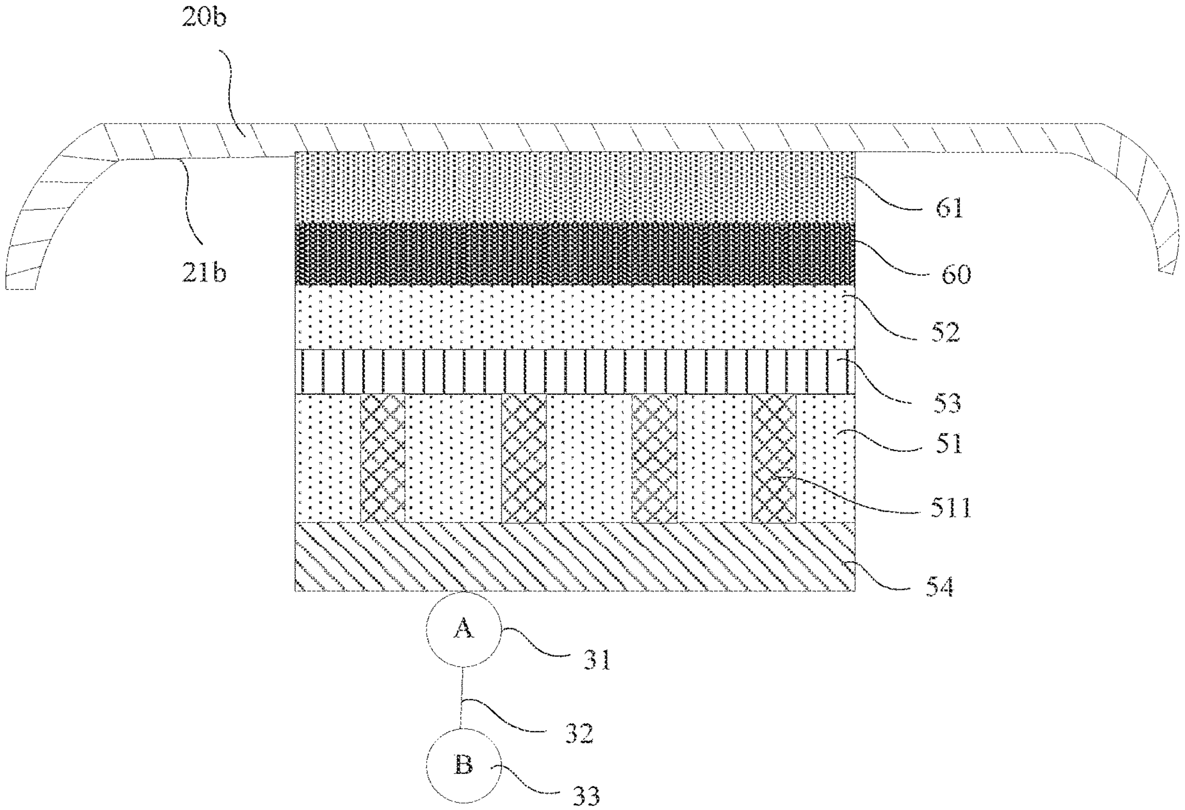
FIG. 5B is another schematic cross-sectional structural diagram of an antenna assembly and a battery cover in an electronic device according to an embodiment of this application.

In this scenario, an example in which the antenna 60 is the FPC antenna is used for description. Referring to FIG. 5B, the FPC antenna is arranged on an inner surface 21*b* of a battery cover 20*b*. A second dielectric layer 52 of the antenna connection apparatus 50 is connected to a side of the FPC antenna. A solder pad 54 of the antenna connection apparatus 50 is connected to a feed point 31 by SMT bonding. In this scenario, a first dielectric layer 51 and the second dielectric layer 52 are the same in material, and are both hard film layers made of an inflexible material. For example, the first dielectric layer 51 and the second dielectric layer 52 are both made of a resin with a flame resistance grade of FR4.

When the antenna 60 is in direct contact with and connected to the battery cover 20*b*, because the antenna 60 and the battery cover 20*b* are both made of hard materials, a gap tolerance between the antenna 60 and the battery cover 20*b* is relatively large. In this way, fluctuation of a coupling capacitance between the antenna 60 and the coupling metal layer 53 is relatively large. Therefore, in this scenario, a third dielectric layer 61 made of a flexible material is arranged between the antenna 60 and an inner surface of the battery cover 20*b*. The third dielectric layer 61 may absorb a deformation amount, so that the gap tolerance between the antenna 60 and the battery cover 20*b* is reduced, thereby ensuring that the antenna 60 is more tightly attached to the coupling metal layer 53.

In this embodiment of this application, the third dielectric layer 61 may be a film layer made of non-conductive foam. In this embodiment, when the third dielectric layer 61 arranged between the antenna 60 and the inner surface of the battery cover 20*b* is a foam glue layer, and the antenna 60 is torn off from the battery cover 20*b*, the antenna 60 can be torn off from the battery cover 20*b* together with the second dielectric layer 52 or play a role in buffering the antenna 60, thereby avoiding a problem that the antenna 60 is easily broken when torn off from the battery cover 20*b* when the antenna 60 is directly connected to the inner surface of the battery cover 20*b*.

Certainly, in another scenario, the second dielectric layer 52 may alternatively be arranged as a foam layer, so that the materials of the second dielectric layer 52 and the third dielectric layer 61 may be the same.

Scenario 3

Figure 6A:
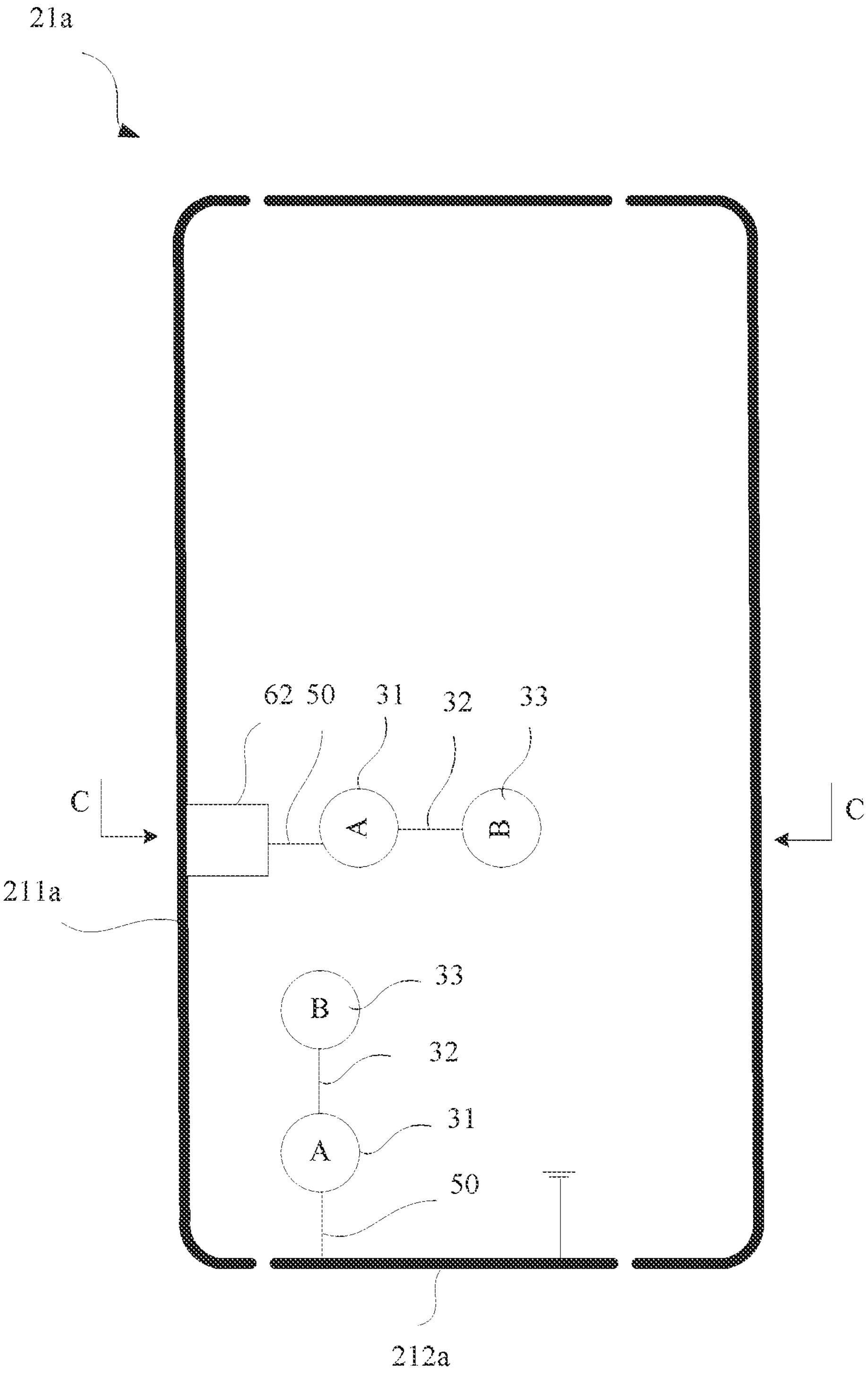
FIG. 6A is a schematic structural diagram of a frame when the frame is used as an antenna in an electronic device according to an embodiment of this application.

In this scenario, an example in which the antenna 60 is a metal frame antenna is used for description. A frame 21*a* of a mobile phone 100 may be a metal frame. The metal frame may be broken to form an antenna. For example, at least a part of a region of the metal frame is used as the antenna 60. Referring to FIG. 6A, the metal frame is divided and formed into a plurality of metal frame antennas, such as a metal frame antenna 211*a* and a metal frame antenna 212*a*.

A solder pad 54 of the antenna connection apparatus 50 is connected to a feed point 31 by SMT bonding. A first dielectric layer 51 is made of a resin with a flame resistance grade of FR4. The second dielectric layer 52 is a foam layer.

Figure 6B:
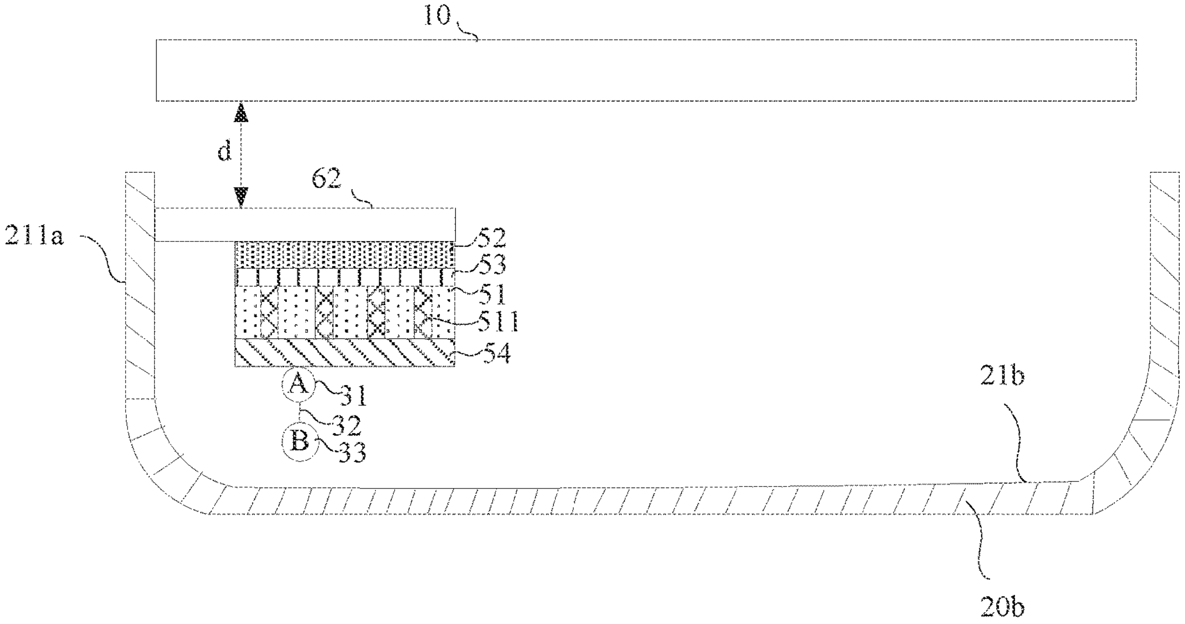
FIG. 6B is a schematic cross-sectional structural diagram of an electronic device along a C-C direction in FIG. 6A according to an embodiment of this application.

When the metal frame is used as the antenna 60, upper and lower inner sides of the frame 21*a* are often perpendicular to upper and lower circuit boards 30. Therefore, in order that the antenna connection apparatus 50 couples the metal frame antenna 211*a* (or the metal frame antenna 212*a*) to the feed point 31 or the ground point 34 on the circuit board 30, in this embodiment, as shown in FIG. 6A and FIG. 6B, there is at least one metal extending portion 62 on the inner side of the metal frame antenna 211*a*. For example, the metal extending portion 62 may extend inward along a direction perpendicular to the inner side of the frame 21*a* to form a metal extending portion 62. The metal frame antenna 211*a* and the metal extending portion 62 are both used as radiators of the antenna 60.

The metal extending portion 62 may be placed in the same direction as the circuit board 30 by arranging the metal extending portion 62. As shown in FIG. 6B, the second dielectric layer 52 of the antenna connection apparatus 50 is connected to the metal extending portion 62. For example, the metal frame antenna 211*a* is connected to the antenna connection apparatus 50 by the metal extending portion 62. The antenna connection apparatus 50 is located between the metal extending portion 62 and the feed point 31 or the ground point 34 in a longitudinal cross-section. It should be noted that one metal extending portion 62 is shown in FIG. 6A. In an actual application, the metal frame antenna is correspondingly provided with one or two metal extending portions 62 (in which one is grounded and the other one is connected to the feed point).

A part of the inner side of the metal frame antenna 211*a* faces inward and extends along a horizontal direction to form a boss. The boss is used as the metal extending portion 62, which ensures that the frame 21*a* and the metal extending portion 62 are integrally formed. As integral components, the frame 21*a* and the metal extending portion 62 are easier to be assembled during assembly.

In this embodiment, the metal frame antenna (for example, the metal frame antenna 211*a*) is coupled to the feed point 31 or the ground point 34 by arranging the metal extending portion 62.

Moreover, in this embodiment, because there is no restriction on a connection area between the antenna connection apparatus 50 and the antenna 60, a connection area between the antenna connection apparatus 50 and the metal extending portion 62 may be reduced. During arrangement, a cross-sectional area of the metal extending portion 62 along a direction parallel to a display screen 10 may be reduced, so that an overlapping area between the metal extending portion 62 and the display screen 10 in a direction perpendicular to the screen is reduced, thereby reducing an impact of a metal layer (for example, a touch electrode layer, a gate metal layer, or a pixel electrode layer) in the display screen 10 on radiation performance of the antenna 60.

In addition, in this scenario, because the second dielectric layer 52 in the antenna connection apparatus 50 is the foam layer, when a position of the circuit board 30 remains unchanged, the second dielectric layer 52 may be compressed under an external force. Therefore, when the metal extending portion 62 of the antenna 60 is connected to the second dielectric layer 52, the metal extending portion 62 may move toward the coupling metal layer 53 under the external force as the second dielectric layer 52 is compressed, so that a distance d between the display screen 10 and the metal extending portion 62 increases (referring to FIG. 6B). That is, the metal extending portion 62 of the metal frame antenna is far away from the display screen 10, so that the metal extending portion 62 of the metal frame antenna is far away from the metal layer in the display screen 10. In this way, a clearance between the metal extending portion 62 of the antenna 60 and the metal layer in the display screen 10 increases, so that the radiation performance of the antenna 60 is better.

In the descriptions of the embodiments of this application, it should be noted that, unless expressly stated and defined otherwise, the terms “mounting”, “connected”, “connection”, or the like are to be construed broadly, for example, as a fixed connection, an indirect connection through an intermediary, or internal communication between two components or mutual interaction relationship between two components. A person of ordinary skill in the art may understand the specific meanings of the foregoing terms in the embodiments of this application according to specific situations.

In the specification of the embodiments of this application, claims, and accompanying drawings, the terms “first”, “second”, “third”, “fourth”, and so on (if existing) are intended to distinguish between similar objects but do not necessarily indicate a specific order or sequence.

Finally, it should be noted that the foregoing embodiments are merely used for describing the technical solutions of the embodiments of this application, but are not intended to limit the embodiments of this application. Although the embodiments of this application is described in detail with reference to the foregoing embodiments, a person of ordinary skill in the art should understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of this application.

What is claimed is:

1. An antenna connection apparatus, configured to couple an antenna to a feed point or a ground point, the antenna connection apparatus comprising:

a solder pad;

a first dielectric layer;

a coupling metal layer; and a second dielectric layer;

wherein the solder pad, the first dielectric layer, the coupling metal layer, and the second dielectric layer are stacked on each other, the first dielectric layer being located between the solder pad and the coupling metal layer, the coupling metal layer being located between the first dielectric layer and the second dielectric layer, and the solder pad being electrically connected to the coupling metal layer by at least one via hole arranged in the first dielectric layer;

wherein a side of the solder pad facing away from the first dielectric layer is electrically connected to the feed point or the ground point;

wherein a side of the second dielectric layer facing away from the coupling metal layer is connected to the antenna, to allow the antenna to be coupled to the coupling metal layer;

wherein hardness of the second dielectric layer is less than hardness of the first dielectric layer, and wherein the second dielectric layer is an insulation layer made of a flexible material, and the first dielectric layer is an insulation layer made of an inflexible material; and wherein the second dielectric layer is arranged at intervals on the coupling metal layer to expose a part of a region of the coupling metal layer so that, as the second dielectric layer is connected to the antenna, there is a gap between the coupling metal layer and the antenna, thereby facilitating flowing of air in the gap for heat dissipation of the antenna connection apparatus.

2. The antenna connection apparatus according to claim 1, wherein the second dielectric layer is a foam layer.

3. The antenna connection apparatus according to claim 1, wherein the first dielectric layer is a dielectric layer made of a resin material, ceramic, or a composite material.

4. The antenna connection apparatus according to claim 1, wherein a thickness of the second dielectric layer is not greater than 3 mm.

5. The antenna connection apparatus according to claim 1, wherein a thickness of the first dielectric layer is greater than 0.1 mm.

6. The antenna connection apparatus according to claim 1, wherein an orthographic projection area of the antenna connection apparatus facing the antenna is less than or equal to 1 $mm^2$.

7. The antenna connection apparatus according to claim 1, wherein an orthographic projection of the second dielectric layer on the coupling metal layer completely covers the coupling metal layer; or wherein the orthographic projection of the second dielectric layer on the coupling metal layer partially covers the coupling metal layer.

8. An antenna assembly, comprising:

at least one antenna;

a feed point;

a feed electrically connected to the feed point; and at least one antenna connection apparatus, including a solder pad, a first dielectric layer, a coupling metal layer, and a second dielectric layer;

wherein the solder pad, the first dielectric layer, the coupling metal layer, and the second dielectric layer in the at least one antenna connection apparatus are stacked on each other, the first dielectric layer being located between the solder pad and the coupling metal layer, the coupling metal layer being located between the first dielectric layer and the second dielectric layer, and the solder pad being electrically connected to the coupling metal layer by at least one via hole arranged in the first dielectric layer;

wherein a side of the solder pad facing away from the first dielectric layer is electrically connected to the feed point or the ground point;

wherein a side of the second dielectric layer facing away from the coupling metal layer is connected to the antenna, to allow the antenna to be coupled to the coupling metal layer;

wherein hardness of the second dielectric layer is less than hardness of the first dielectric layer, and wherein the second dielectric layer is an insulation layer made of a flexible material, and the first dielectric layer is an insulation layer made of an inflexible material;

wherein the solder pad in the at least one antenna connection apparatus is electrically connected to the feed point, and a second dielectric layer in the at least one antenna connection apparatus is connected to the at least one antenna; and wherein the second dielectric layer is arranged at intervals on the coupling metal layer to expose a part of a region of the coupling metal layer so that, as the second dielectric layer is connected to the antenna, there is a gap between the coupling metal layer and the antenna, thereby facilitating flowing of air in the gap for heat dissipation of the antenna connection apparatus.

9. The antenna assembly according to claim 8, further comprising:

a ground point; and a plurality of antenna connection apparatuses being arranged such that the at least one antenna is coupled and electrically connected to the feed point by one of the antenna connection apparatuses in the plurality of antenna connection apparatuses, and the at least one antenna is coupled and electrically connected to the ground point by another one of the antenna connection apparatuses in the plurality of antenna connection apparatuses.

10. The antenna assembly according to claim 9, wherein the solder pad in the at least one antenna connection apparatus is electrically connected to the feed point or the ground point by using a surface mount technology (SMT); and wherein the second dielectric layer in the at least one antenna connection apparatus is connected to the antenna in a bonding manner.

11. An electronic device, comprising:

a display screen;

a circuit board; and a housing, the circuit board being located in a space defined by the housing and the display screen, the circuit board comprising: the antenna assembly according to claim 8, wherein the feed point and the feed in the antenna assembly are arranged on the circuit board.

12. The electronic device according to claim 11,
wherein at least one of the antennas in the antenna assembly is arranged on an inner surface of the housing facing the display screen; and
wherein a third dielectric layer made of a flexible material is arranged between the at least one antenna and the inner surface of the housing.

13. The electronic device according to claim 12, wherein the third dielectric layer is a dielectric layer made of non-conductive foam.

14. The electronic device according to claim 11, wherein the at least one antenna is a flexible printed circuit (FPC) antenna, a laser-direct-structuring (LDS) antenna, a mode decoration antenna (MDA), or a metal frame antenna.

15. The electronic device according to claim 14,
wherein the housing comprises a metal frame, and at least a part of a region of the metal frame is used as the at least one antenna; and
wherein an inner side of the metal frame used as the antenna is provided with at least one metal extending portion, and the at least one antenna is connected to the second dielectric layer in the antenna connection apparatus by the metal extending portion.

16. The electronic device according to claim 15, wherein a part of the inner side of the metal frame faces inward and extends along a horizontal direction to form a boss, and the boss is used as the metal extending portion.

* * * * *